(12) United States Patent
Mammou et al.

(10) Patent No.: US 10,462,485 B2
(45) Date of Patent: Oct. 29, 2019

(54) POINT CLOUD GEOMETRY COMPRESSION

(71) Applicant: Apple Inc., Cupertino, CA (US)

(72) Inventors: Khaled Mammou, Vancouver (CA); Fabrice A. Robinet, Sunnyvale, CA (US); Andrea Cremaschi, Bergamo (IT); Alexandros Tourapis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/121,501

(22) Filed: Sep. 4, 2018

(65) Prior Publication Data

US 2019/0075320 A1 Mar. 7, 2019

Related U.S. Application Data

(60) Provisional application No. 62/555,003, filed on Sep. 6, 2017.

(51) Int. Cl.
*H04N 19/60* (2014.01)
*H04N 19/597* (2014.01)
(Continued)

(52) U.S. Cl.
CPC ........... *H04N 19/597* (2014.11); *G06T 17/00* (2013.01); *H04N 19/119* (2014.11);
(Continued)

(58) Field of Classification Search
CPC .. H04N 19/597; H04N 19/167; H04N 19/119; H04N 19/182; H04N 19/132; H04N 19/59; G06T 17/00; G06T 2210/56
See application file for complete search history.

(56) References Cited

U.S. PATENT DOCUMENTS 9,530,225 B1 * 12/2016 Nieves ................... G06T 9/005
9,734,595 B2    8/2017 Lukac et al.
(Continued)

FOREIGN PATENT DOCUMENTS

WO       2012049471        4/2012

OTHER PUBLICATIONS

Siheng Chen, et al., "Fast Resampling of 3D Point Clouds via Graphs", arXiv:1702.06397v, Feb. 11, 2017, pp. 1-15.
(Continued)

*Primary Examiner* — Howard D Brown, Jr.
(74) *Attorney, Agent, or Firm* — Robert C. Kowert; Meyertons, Hood, Kivlin, Kowert & Goetzel, P.C.

(57) ABSTRACT

A system comprises an encoder configured to compress a point cloud comprising a plurality of points each point comprising spatial information for the point. The encoder is configured to sub-sample the points and determine subdivision locations for the subsampled points. Also, the encoder is configured to determine, for respective subdivision location, if a point is to be included, not included, or relocated relative to the subdivision location. The encoder encodes spatial information for the sub-sampled points and encodes subdivision location point inclusion/relocation information to generate a compressed point cloud. A decoder recreates an original or near replica of an original point cloud based on the spatial information and the subdivision location inclusion/relocation information included in the compressed point cloud.

20 Claims, 11 Drawing Sheets

(51) Int. Cl.
  *H04N 19/59*      (2014.01)
  *H04N 19/132*     (2014.01)
  *H04N 19/119*     (2014.01)
  *H04N 19/182*     (2014.01)
  *H04N 19/167*     (2014.01)
  *G06T 17/00*      (2006.01)

(52) U.S. Cl.
  CPC ......... *H04N 19/132* (2014.11); *H04N 19/167* (2014.11); *H04N 19/182* (2014.11); *H04N 19/59* (2014.11); *G06T 2210/56* (2013.01)

(56) References Cited

U.S. PATENT DOCUMENTS

| | | | |
|---|---|---|---|
| 2011/0010400 A1* | 1/2011 | Hayes | G01S 7/48 707/803 |
| 2011/0216063 A1* | 9/2011 | Hayes | G06T 17/20 345/423 |
| 2015/0268058 A1* | 9/2015 | Samarasekera | G06K 9/00637 701/409 |
| 2016/0047903 A1* | 2/2016 | Dussan | G01S 7/484 356/5.01 |
| 2017/0214943 A1 | 7/2017 | Cohen et al. | |
| 2017/0249401 A1 | 8/2017 | Eckart et al. | |
| 2017/0347122 A1* | 11/2017 | Chou | H04N 19/60 |

OTHER PUBLICATIONS

International Search Report and Written Opinion from PCT/US2018/049523, dated Nov. 28, 2018, Apple Inc., pp. 1-15.

M. Waschbusch, et al., "Progressive Compression of Point-Sampled Models", Eurographics Symposium on Point-Based Graphics, 2004, pp. 1-9.

* cited by examiner

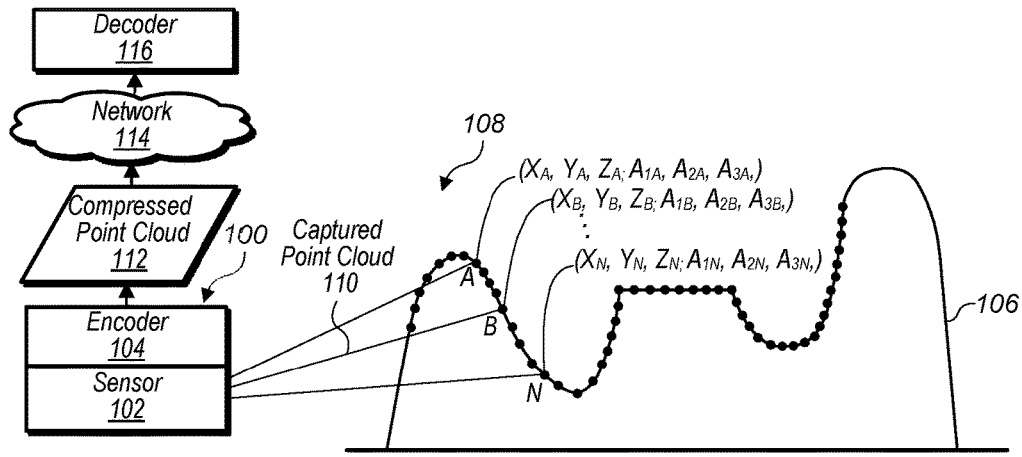
FIG. 1A
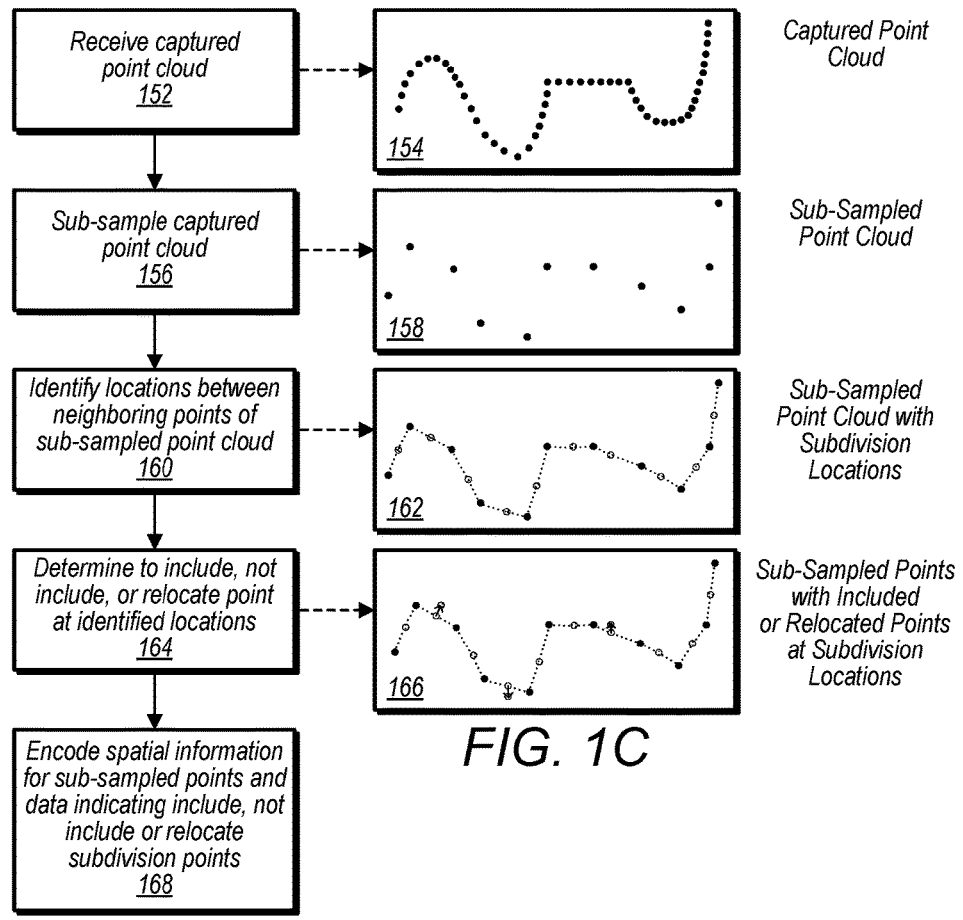
FIG. 1B
FIG. 1C

Compressed Point Cloud File 300

---

Configuration Information 304
- K (Number of nearest neighbors to identify)
- D0 (Minimum range for identifying nearest neighbor)
- D1 (Maximum range for identifying nearest neighbor)
- D2 (Minimum distance for location between neighbors)
- M (Relative location for subdivision between neighbors)
- N (Number of subdivision iterations to perform)
- AI (Additional configuration information)

---

Point Cloud Data 306
Spatial and Attribute Information for Sub-Sampled Points
$(X_A, Y_A, Z_A; A_{1A}, A_{2A}, A_{3A},) \ldots (X_N, Y_N, Z_N; A_{1N}, A_{2N}, A_{3N},)$

---

Subdivision Location Point Inclusion / Relocation Data 308

Point A, $1^{st}$ iteration    Neighbor 1 Include Point
                                           Neighbor 2 Relocate Point to $X_R, Y_R, Z_R$
                                           Neighbor 3 Don't include Point Point A, $2^{nd}$ iteration    Neighbor 1 Include Point
                                           Neighbor 2 Relocate, Normal Scalar R

.
.
.

---

Additional Points to Include 310
- Additional Point 1 $(X, Y, Z; A_1, A_2, A_3)$
- Additional Point 2 $(X, Y, Z; A_1, A_2, A_3)$

POINT CLOUD GEOMETRY COMPRESSION

PRIORITY DATA

This application claims benefit of priority to U.S. Provisional Application Ser. No. 62/555,003, titled "Point Cloud Compression", filed Sep. 6, 2017, by Khaled Mammou, Fabrice A. Robinet, Andrea Cremaschi, and Alexandros Tourapis, which is hereby incorporated by reference in its entirety.

BACKGROUND

Technical Field

This disclosure relates generally to compression and decompression of point clouds comprising a plurality of points each having associated spatial information and, in some embodiments, additional attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, some such systems may further capture attribute information in addition to spatial information for the respective points, such as color information (e.g. RGB values), intensity attributes, reflectivity attributes, or various other attributes. In some circumstances, other attributes may be assigned to the respective points, such as a time-stamp when the point was captured. Points captured by such sensors may make up a "point cloud" comprising a set of points each having associated spatial information. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

SUMMARY OF EMBODIMENTS

In some embodiments, a system includes one or more sensors configured to capture points that collectively make up a point cloud, wherein each of the points comprises spatial information identifying a spatial location of the respective point. The system also includes an encoder configured to generate a compressed point cloud, wherein the compressed point cloud comprises spatial information for fewer points than the number of points of the captured point cloud, but wherein the spatial information for points included in the compressed point cloud and additional data included in the compressed point cloud is organized in such a way that a decoder may recreate the captured point cloud or a close approximation of the captured point cloud based on the compressed point cloud. To generate the compressed point cloud, the encoder is configured to sub-sample the captured point cloud captured by the one or more sensors, wherein the sub-sampled point cloud comprises fewer points than the captured point cloud. The encoder is further configured to, for each of respective ones of the points of the sub-sampled point cloud, identify a location between the respective point of the sub-sampled point cloud and a neighboring point in the sub-sampled point cloud and determine, based on comparing the location to the captured point cloud, whether a point in a decompressed point cloud is to be included at the location, not included at the location, or relocated relative to the location. The encoder is further configured to encode data for the compressed point cloud comprising spatial information for the points of the sub-sampled point cloud and data indicating, for each of the respective locations, whether a respective point is to be included at the location, not included at the location, or relocated relative to the location in the decompressed point cloud. In some embodiments, a system may omit the one or more sensors and the encoder may receive an original point cloud, to be compressed, from sensors of another system, or from another source.

In some embodiments, a method includes sub-sampling a point cloud, wherein the sub-sampled point cloud comprises fewer points than the point cloud. The method also includes, for each of respective ones of the points of the sub-sampled point cloud, comparing a location between the respective point of the sub-sampled point cloud and a neighboring point in the sub-sampled point cloud to the point cloud prior to the sub-sampling and determining, based on the comparison, whether: a point is to be included at the location, not included at the location, or relocated relative to the location in a decompressed point cloud. The method further includes encoding data comprising spatial information for the points of the sub-sampled point cloud and data indicating, for each of the respective locations, whether a respective point is to be included at the location, not included at the location, or relocated relative to the location in a decompressed point cloud.

In some embodiments, a non-transitory computer-readable medium stores program instructions that, when executed by one or more processors, cause the one or more processors to implement a decoder configured to receive a compressed point cloud, wherein the compressed point cloud comprises spatial information for points of a sub-sampled point cloud and data indicating, for each of a plurality of respective locations between respective points of the sub-sampled point cloud and respective neighboring points in the sub-sampled point cloud, whether a point is to be included at the respective location, not included at the respective location, or relocated relative to the respective location in a decompressed point cloud. The program instructions, when executed, further cause the decoder to, for each of respective ones of the points of the sub-sampled point cloud, identify a respective location between the respective point and a neighboring point in the sub-sampled point cloud and determine, based on the data included in the received compressed point cloud, whether to include, not include, or relocate a point at the respective location. The program instructions, when executed, further cause the decoder to generate the decompressed point cloud, wherein the decompressed point cloud comprises the points of the sub-sampled point cloud and the respective points determined to be included at the respective locations or relocated relative to the respective locations.

BRIEF DESCRIPTION OF THE DRAWINGS

FIG. 1A illustrates a system comprising a sensor that captures information for points of a point cloud and an encoder that compresses a point cloud, wherein the compressed point cloud is sent to a decoder, according to some embodiments.

FIG. 1B illustrates a process for encoding a compressed point cloud, according to some embodiments.

FIG. 1C illustrates representative views of a point cloud at different stages of an encoding process, according to some embodiments.

FIG. 3 illustrates components of an example compressed point cloud file, according to some embodiments.

Figure 2A:
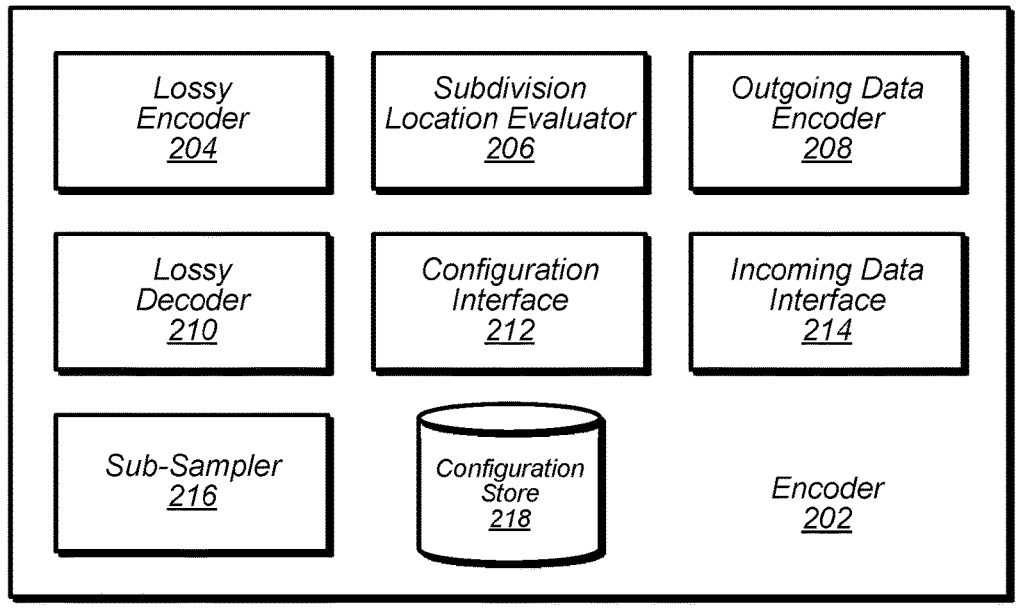
FIG. 2A illustrates components of an encoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses a point cloud file such that the point cloud file may be stored and transmitted more quickly than non-compressed point clouds and in a manner that the point cloud file may occupy less storage space than non-compressed point clouds. In some embodiments, point cloud compression may enable a point cloud to be communicated over a network in real-time or in near real-time. For example, a system may include a sensor that captures data about points in an environment where the sensor is located, wherein the captured points make up a point cloud. The system may also include an encoder that compresses the captured point cloud. The compressed point cloud may be sent over a network in real-time or near real time to a decoder that decompresses the compressed point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real time or near real time. In some embodiments, the decoder may be associated with an augmented reality system and the decompressed point cloud may be displayed or otherwise used by the augmented reality system.

In some embodiments, a system may include a decoder that receives one or more point cloud files via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, a holographic display, or the head-mounted display, a system associated with the decoder may request point cloud files from the remote server based on user manipulations of the displays, and the point cloud files may be transmitted from the remote server to the decoder and decoded by the decoder in real time or near real-time. The displays may then be updated with updated point cloud data responsive to the user manipulations.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location). In some embodiments, such sensors may also capture attribute information for one or more of the points, such as color attributes, reflectivity attributes, velocity attributes, acceleration attributes, time attributes, and/or various other attributes.

In some embodiments, an encoder may receive a point cloud that is to be compressed and may sub-sample the point cloud to generate a sub-sampled point cloud. For example, in some embodiments, a point cloud may comprise a million points, and a sub-sampled point cloud generated by sub-sampling the point cloud may include as few as 1,000 or 2,000 points. In some embodiments, sub-sampling may be performed at uniform point intervals or uniform distances. For example, in some embodiments, sub-sampling may comprise including every $100^{th}$, $1,000^{th}$, or $N^{th}$ point in the point cloud in the sub-sampled point cloud, or may comprise including a point at every D increment of distance in the X, Y, or Z direction in the sub-sampled point cloud. In some embodiments, sub-sampling may include filtering points in a point cloud, for example to reduce aliasing. In some embodiments, other sub-sampling techniques may be used.

Once the sub-sampled point cloud is generated, the encoder may identify a set of one or more neighboring points for each of a plurality of respective points of the sub-sampled point cloud. For example, the encoder may select a first point in the sub-sampled point cloud and may identify a set of nearest neighboring points in the sub-sampled point cloud to the selected point being evaluated. For each of the identified neighboring points, the encoder may determine a subdivision location between the selected point being evaluated and the respective neighboring points of the set of nearest neighboring points. The encoder may also compare the subdivision location between the point being evaluated and the respective neighboring point to the original point cloud prior to the sub-sampling. If the location is within a range of a point included in the original point cloud, the encoder may determine that a point is to be included in a decompressed point cloud at the subdivision location and may include an indication in data encoded for a compressed point cloud indicating inclusion of a point at the subdivision location. If the location is outside of a range from points included in the original point cloud, the encoder may determine that a point is not to be included at the subdivision location in a decompressed point cloud, and may include such an indication in data for a compressed point cloud. Also, the encoder may determine that a point is within the range to be included in the decompressed point cloud but is at a distance away from a point included in the original point cloud. In such a circumstance, the encoder may include information in data for the compressed point cloud indicating a point is to be relocated relative to the subdivision location in a decompressed point cloud. For example, the encoder may compare a location of a point in the original point cloud adjacent to the subdivision location to the location of the subdivision location to determine how a point is to be relocated relative to the subdivision location. The encoder may continue this process for each identified neighboring point in the set of neighboring points identified for the selected point being evaluated. The encoder may then repeat a similar process for a next point in the sub-sampled point cloud that is to be evaluated until at least a significant portion of the points in the sub-sampled point cloud have been evaluated.

Additionally, the encoder may compare the sub-sampled point cloud and points determined to be included at the respective locations between points of the sub-sampled point cloud (e.g. subdivisions) or points to be relocated relative to the respective locations at the subdivisions and may determine that one or more additional points are to be included in the decompressed point cloud to accurately represent the original point cloud. In some embodiments, spatial information for the one or more additional points may be explicitly encoded in data for the compressed point cloud.

In some embodiments, an encoder may perform multiple iterations of determining points to be located or relocated at subdivision locations of a sub-sampled point cloud and may perform multiple iterations of determining one or more additional points that are to be included in a decompressed point cloud. For example, an encoder may update the sub-sampled point cloud to include the points at the subdivision locations that are determined to be included in the decompressed point cloud, to include the points determined to be relocated relative to the subdivision locations, and to include the additional points determined to be included in the decompressed point cloud. The encoder may then repeat the subdivision process by selecting respective ones of the points included in the updated sub-sampled point cloud, identifying nearest neighboring points of the selected points, and determining whether to include, not include, or relocate points at subdivision locations between the selected points and the nearest neighboring points. The encoder may also determine based on comparing the updated sub-sampled point cloud including any points determined to be included at newly subdivided locations whether or not one or more additional points are to be included in the decompressed point cloud. The encoder may repeat this process for multiple iterations. In some embodiments, an encoder and decoder may perform iterations per a pre-specified or determined number of subdivision iterations to be performed (N). In some embodiments, a number of subdivision iteration to be performed (N) may be a user-configurable parameter or may be a parameter determined at the encoder based on the point cloud data being processed, or a combination thereof. For example in some embodiments the number of iterations to be performed may be based on an average, minimum, or maximum value between the user configurable parameter and an encoder based derived parameter. In some embodiments, a number of subdivision iterations to be performed may be a fixed value. In some embodiments, a number of subdivision iterations to be performed may be pre-determined and known by both the encoder and decoder. In some embodiments, an encoder may include data indicating a number of subdivision iterations to be performed in data for a compressed point cloud.

The encoder may encode the spatial information for the points of the sub-sampled point cloud and information indicating whether points are to be included at subdivision locations, not included at subdivision locations, or relocated relative to subdivision locations. Additionally, spatial information for any additional points determined to be included in the decompressed point cloud may be encoded.

An encoder may also encode configuration information, such as described above, to be sent along with sub-sampled point data and subdivision point inclusion, non-inclusion, or relocation data for a compressed point cloud. For example, an encoder may encode data indicating a number of subdivision iterations (N) that are to be performed, a number of nearest neighbors that are to be included in a set of nearest neighbors (K), a minimum distance from a point for a nearest neighbor when identifying nearest neighbors (D0), a maximum distance from a point for a nearest neighbor when identifying nearest neighbors (D1), a threshold distance for a location of a subdivision when determining whether a point is to be included at a subdivision location (D2), etc. In some embodiments, the distances D0, D1, and/or D2 may be computed as Euclidian distances between a point being evaluated and a nearest neighboring point or a subdivision location. The configuration information may enable a decoder to recreate the same subdivision locations as were evaluated at the encoder based on the spatial information of the points of the sub-sampled point cloud. In this way, the decoder may recreate the original point cloud or a close representation of the original point cloud while only receiving spatial information for a portion of the points of the original point cloud (e.g. the spatial information of the sub-sampled points of the point cloud). Because explicit spatial information for far fewer points is included in the compressed point cloud data, the compressed point cloud data may occupy less storage space than non-compressed data for the original or captured point cloud and may be transmitted more quickly and/or with fewer network resources than non-compressed data for the original or captured point cloud.

FIG. 1A illustrates a system comprising a sensor that captures information for points of a point cloud and an encoder that compresses a point cloud that is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and/or attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity of the structure at the point, an acceleration of the structure at the point, a reflectance of the structure at the point, a time stamp indicating when the point was captured, or other attributes. The captured point cloud 110 may be provided to encoder 104, wherein encoder 104 generates a compressed version of the point cloud (compressed point cloud 112) that is transmitted via network 114 to decoder 116.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

FIG. 1B illustrates a process for encoding a compressed point cloud, according to some embodiments. Also, FIG. 1C illustrates representative views of a point cloud at different stages of an encoding process, according to some embodiments.

At 152, an encoder, such as encoder 104, receives a captured point cloud, such as captured point cloud 110 illustrated in FIG. 1A or captured point cloud 154 illustrated in FIG. 1C. Note that captured point cloud 110 and 154 are illustrated in two dimensions for ease of illustration, but in some embodiments may comprise three-dimensional point clouds.

At 156, the encoder sub-samples the point cloud to generate a sub-sampled point cloud. For example, FIG. 1C illustrates sub-sampled point cloud 158. In some embodiments, an encoder may uniformly sample the point cloud to generate the sub-sampled point cloud. For example, the encoder may select points at uniform intervals in a point cloud to generate a sub-sampled point cloud. In some embodiments, an encoder may use a lossy compression algorithm when encoding spatial information of a sub-sampled point cloud to be used to generate a decompressed sub-sampled point cloud. In some such embodiments, an encoder may encode the sub-sampled point cloud using the lossy compression algorithm and may decode, at the encoder, the lossy encoded sub-sampled point cloud to generate a representative sub-sampled point cloud that a decoder will encounter when decoding spatial information for points of a sub-sampled point cloud encoded according to the lossy compression algorithm. In some embodiments, an encoder may use a lossless compression algorithm for encoding spatial information for points of a sub-sampled point cloud, and the encoder may omit encoding and decoding the sub-sampled point cloud to generate a representative sub-sampled point cloud to be encountered by a decoder. This is because when using a lossless compression algorithm, the sub-sampled point cloud is representative of what the decoder will encounter when decoding the spatial information for the points of the sub-sampled point cloud that were encoded according to the lossless compression algorithm.

At 160, the encoder identifies subdivision locations between respective points of the sub-sampled point cloud and neighboring points of the respective points of the sub-sampled point cloud. For example as illustrated in 162 of FIG. 1C. At 164, the encoder determines whether a point is to be included in the decompressed point cloud at the subdivision location, not included in the decompressed point cloud at the subdivision location, or relocated in the decompressed point cloud relative to the subdivision location. For example, as illustrated in 166 of FIG. 1C.

In some embodiments, multiple subdivision locations may be determined between a given point and respective ones of a set of neighboring points to the given point and a determination may be made for each one of the multiple subdivision locations as to whether a point is to be included in the decompressed point cloud at the subdivision location, not included in the decompressed point cloud at the subdivision location, or relocated in the decompressed point cloud relative to the subdivision location. In each instance, the determination to include, not include, or relocate a point relative to a subdivision location may be determined based on comparing the subdivision location to the original point cloud prior to the sub-sampling. For example, if the subdivision location falls on a surface of the original point cloud, the encoder may determine a point should be included at the subdivision location in the decompressed point cloud. Conversely, if the subdivision location is more than a threshold distance from a surface of the original point cloud, the encoder may determine that a point is not to be included at the subdivision location. If the subdivision location is within a threshold range of a surface of the original point cloud, but would need to be adjusted to align with the surface of the original point cloud, the encoder may determine to relocate a point in the decompressed point cloud relative to the subdivision location such that the relocated point more closely aligns with the original point cloud.

In some embodiments, an encoder may further encode temporal information in addition to spatial information. For example, each point may have a time attribute associated with the point, such as a time when the point was captured. In some embodiments, in which temporal information is being encoded, the encoder may further determine whether to include, not include, or relocate a point relative to a subdivision location based on temporal information, such as whether or not the point cloud has changed at the subdivision location from one time increment to the next, as an example. Or, based on whether a point was included at the subdivision location in a previous version of the decompressed point cloud at an earlier moment in time.

In some embodiments, an encoder may determine that one or more additional points are to be included in a decompressed point cloud. For example, if the original captured point cloud has an irregular surface or shape such that subdivision locations between points in the sub-sampled point cloud do not adequately represent the irregular surface or shape, the encoder may determine to include one or more additional points in addition to points determined to be included at subdivision locations or relocated relative to subdivision locations in the decompressed point cloud. In some embodiments, data representing the additional points may be explicitly encoded in addition to the sub-sampled points included in the data for the compressed point cloud.

In some embodiments an encoder may perform 160 and 164 for each point in a sub-sampled point cloud. Also, in some embodiments, an encoder may add any points determined to be included or relocated relative to a location and any other additional points determined to be included in a decompressed point cloud to generate an updated sub-sampled point cloud. The encoder may then perform 160 and 164 for each of the points of the updated sub-sampled point cloud. In some embodiments, an encoder may continue to iterate through 160 and 164 and update a sub-sampled point cloud for a particular number of iterations, for example a specified or determined parameter (N). In some embodiments, a number of subdivision iterations to be performed may be a configurable parameter that is configured at the encoder and communicated to a decoder along with the compressed point cloud. In some embodiments, an encoder and decoder may be configured to perform a fixed number of subdivision iterations.

Once the encoder has completed evaluating the respective subdivision locations to determine if a point is to be included, not included, or relocated at each of the respective subdivision locations and has iterated through this process for all the subdivision iterations required per the iteration parameter, the encoder may, at 168, encode the spatial information and/or attribute information for the points of the sub-sampled point cloud and may also encode data indicating for each of the respective subdivision locations whether a point is to be included, or not included at the respective subdivision location. For points that are to be relocated in the decompressed point cloud, the encoder may further encode location correction data indicating how the point is to be relocated relative to the subdivision location. In some embodiments, the encoder may additionally encode spatial and/or attribute information for additional points to be added to the decompressed point cloud and may encode other configuration information.

For example, 166 of FIG. 1C illustrates points at subdivision locations being relocated to align with the original captured point cloud. In some embodiments, this location correction information may be encoded as delta X, delta Y, or delta Z spatial information relative to the subdivision location. In other embodiments, this location correction information may be encoded as a scalar value that may be determined via a dot product between a vector from the subdivision location to the relocated location and a normal vector at the subdivision location, where the normal vector is normal to a surface of the sub-sampled point cloud prior to relocating the point to the relocated location. In some embodiments, location correction data may be arithmetically encoded or encoded according to Golomb encoding techniques, or other suitable lossless encoding techniques.

In some embodiments, an encoder may further encode temporal information in addition to spatial information. For example, each point may have a time associated with the point, such as a time when the point was captured. In some embodiments, in which temporal information is being encoded, the encoder may further determine whether to include, not include, or relocate a point relative to a subdivision location based on temporal information, such as whether or not the point cloud has changed at the subdivision location from one time increment to the next, as an example. As another example, an encoder may determine that a point included at a particular time increment in an original (non-compressed) point cloud that does not appear at previous time increments (e.g. frames) in the original point cloud and/or that does not appear at subsequent time increments (e.g. frames) in the original point cloud is not an important point. In response to such a determination, an encoder may determine that a point does not need to be included at a subdivision location corresponding to the point in the original point cloud. An encoder may utilize similar temporal considerations when determining whether or not to relocate a point relative to a sub-division location and/or when determining whether to include spatial information for additional points in a point cloud.

Additionally, spatial information for any additional points determined to be included in a decompressed point cloud may be encoded and included in the compressed point cloud. Also, data indicating configurable parameters, such as a number of nearest neighbors (K) to include in a set of nearest neighbors for a point when determining subdivision locations, a minimum distance from a selected point (D0) for nearest neighbors, a maximum distance from a selected point (D1) for nearest neighbors, a minimum distance from a selected point for a subdivision location (D2), a distance between a selected point and a nearest neighbor for a subdivision location (M), for example a midpoint, a number of subdivision iterations to perform (N), etc. may be included in a compressed point cloud sent from an encoder to a decoder or included in a compressed point cloud that is to be stored and later decoded by a decoder. In some embodiments, this additional information included in the compressed point cloud may be encoded using various encoding techniques. For example, arithmetic encoding, Golomb encoding or other suitable lossless or lossy encoding techniques may be used.

Because the compressed point cloud includes spatial information for the sub-sampled points, data indicating inclusion or non-inclusion of points at subdivision locations, data indicating relocation of any points to be relocated relative to subdivision locations, spatial information for any additional points to be included, and configuration information used by the encoder, the decoder can recreate the original captured point cloud or a near replica of the original captured point cloud by performing similar analysis as the encoder. For example, the decoder may determine subdivision locations using the same configuration parameters as the encoder and may include, not include, or relocate points at the subdivision locations per the determinations included in the compressed point cloud. Also, the decoder may include additional points based on the spatial information for the additional points included in the compressed point cloud. A decoder may also determine whether to include additional points based on temporal parameters, such as changes in point locations from frame to frame in a multi-frame point cloud.

FIG. 2A illustrates components of an encoder, according to some embodiments.

Encoder 202 may be a similar encoder as encoder 104 illustrated in FIG. 1A. Encoder 202 includes sub-sampler 216, lossy encoder 204 and lossy decoder 210. As described above, in some embodiments a lossy encoding algorithm may be used to encode spatial information of points of a sub-sampled point cloud. Thus, an encoder, such as encoder 202, may receive a point cloud, for example via incoming data interface 214 and may sub-sample the received point cloud, via a sub-sampler, such as sub-sampler 216, to generate a sub-sampled point cloud. The encoder, may then lossy encode and lossy decode the sub-sampled point cloud, for example via lossy encoder 204 and lossy decoder 210, to generate a representative sub-sampled point cloud that represents a sub-sampled point cloud a decoder will generate when receiving a compressed point cloud comprising sub-sampled points that have been lossy encoded.

In some embodiments, an encoder, such as encoder 202, may further include a configuration interface, such as configuration interface 212, wherein one or more parameters used by the encoder to compress a point cloud may be adjusted via the configuration interface. In some embodiments, a configuration interface, such as configuration interface 212, may be a programmatic interface, such as an API. Configurations used by an encoder, such as encoder 202, may be stored in a configuration store, such as configuration store 218. A subdivision evaluator, such as subdivision location evaluator 206, may perform subdivision location evaluations to determine if points should be included, not included, or relocated relative to subdivision locations. Also, a subdivision location evaluator may determine any additional points that are to be included in a decompressed point cloud generated from data included in a compressed point cloud encoded by the encoder.

Once subdivision location decision information has been determined and any additional points that are to be included in the decompressed point cloud have been determined, the spatial information for the points of the sub-sampled point cloud, the data indicating subdivision location decision information, relocation information, spatial information for any additional points that are to be included in a decompressed point cloud, and configuration information for use in decoding a compressed point cloud may be encoded via an outgoing data encoder, such as outgoing data encoder 208. In some embodiments, an outgoing data encoder may encode outgoing data according to any of various encoding techniques such as arithmetic encoding, Golomb encoding, various lossless encoding techniques, or lossy encoding techniques. In some embodiments, spatial information for points may be encoded according to a lossy encoding technique while relocation information for points that are to be relocated relative to a subdivision location may be encoded according to a lossless encoding technique. In some embodiments, relocation information comprising a few characters may be encoded using a particular encoding technique while relocation information comprising more characters may be encoded using a different encoding technique.

In some embodiments, an encoder, such as encoder 202, may include more or fewer components than shown in FIG. 2A. For example, in some embodiments that encode spatial information using a lossless encoding technique, lossy encoder 204 and lossy decoder 210 may be omitted.

Figure 2B:
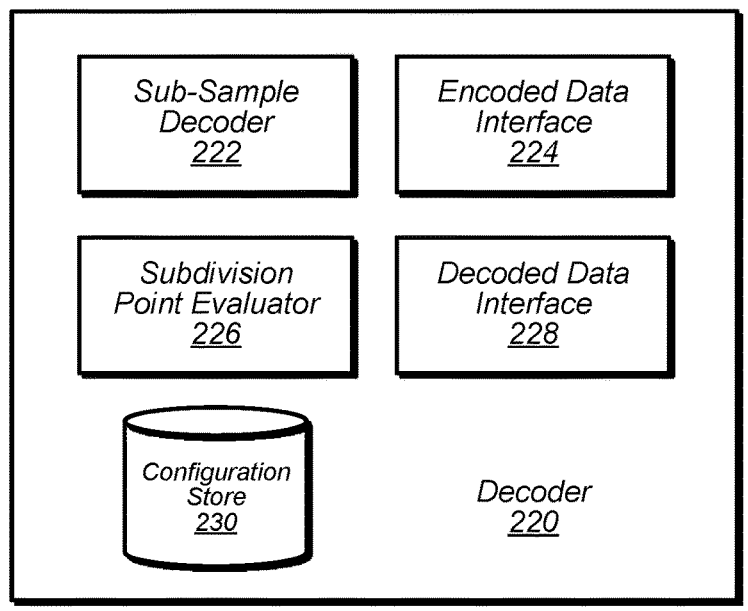
FIG. 2B illustrates components of a decoder, according to some embodiments.

FIG. 2B illustrates components of a decoder, according to some embodiments. Decoder 220 may be a similar decoder as decoder 116 illustrated in FIG. 1A. Decoder 220 includes encoded data interface 224, sub-sample decoder 222, subdivision point evaluator 226, configuration store 230, and decoded data interface 228.

A decoder, such as decoder 220, may receive an encoded compressed point cloud from an encoder, such as compressed point cloud 112 illustrated in FIG. 1A or compressed point cloud file 300 illustrated in FIG. 3, via an encoded data interface, such as encoded data interface 224. The encoded compressed point cloud may be decoded and used by the decoder to determine points of a sub-sampled point cloud. For example, spatial information of points of a sub-sampled point cloud may be decoded by a sub-sample decoder, such as sub-sample decoder 222. In some embodiments, a compressed point cloud may be received via an encoded data interface, such as encoded data interface 224, from a storage device or other intermediary source, wherein the compressed point cloud was previously encoded by an encoder, such as encoder 104.

Once a sub-sampled point cloud is determined, a subdivision point evaluator, such as subdivision point evaluator 226, may determine neighboring points for respective points of the determined sub-sampled point cloud and may determine subdivision locations between the respective points and the respective neighboring points. The subdivision evaluator may also receive decode data included in a compressed point cloud indicating whether a point is to be included or not included at a particular subdivision location, or if the point is to be relocated relative to the subdivision location. In some embodiments, the sub-sample decoder 222 may also decode, via lossy or lossless techniques, encoded data indicating whether a point is to be included or not included at a particular subdivision location and/or relocation information and provide the decoded data to the subdivision point evaluator 226. The subdivision evaluator may determine the subdivision locations based on parameters stored in a configuration store, such as configuration store 230. In some embodiments, at least some of the configurations may be configurable parameters that are configured at an encoder and communicated to the decoder along with the compressed point cloud. In some embodiments, at least some of the parameters may be fixed parameters that are not communicated with a compressed point cloud. In some embodiments, configurable parameters included with a compressed point cloud may be decoded and added to a configuration store, such as configuration store 230, such that the configurable parameters are used by the subdivision point evaluator 226 when determining subdivision locations. In some embodiments, a subdivision point evaluator and/or a sub-sample decoder may further decode spatial information for any additional points that are to be included in the decompressed point cloud, wherein the spatial information for the additional points is included in the encoded compressed point cloud received by the decoder.

A decoder, such as decoder 220, may provide a decompressed point cloud generated based on a received encoded compressed point cloud to a receiving device or application via a decoded data interface, such as decoded data interface 228. The decompressed point cloud may include the points of the sub-sampled point cloud, any points to be included at or relocated relative to a subdivision locations, and any additional points indicated to be included in the decompressed point cloud. In some embodiments, the decompressed point cloud may be used to generate a visual display, such as for a head mounted display. Also, in some embodiments, the decompressed point cloud may be provided to a decision making engine that uses the decompressed point cloud to make one or more control decisions. In some embodiments, the decompressed point cloud may be used in various other applications or for various other purposes.

FIG. 3 illustrates an example compressed point cloud file, according to some embodiments. Point cloud file 300 includes configuration information 304, point cloud data 306, subdivision location point inclusion/relocation data 308, and additional points to be included in a decompressed point cloud 310. In some embodiments, point cloud file 300 may be communicated in parts via multiple packets. In some embodiments, not all of the sections shown in point cloud file 300 may be included in each packet transmitting compressed point cloud information. In some embodiments, a point cloud file, such as point cloud file 300 may be stored in a storage device, such as a server that implements an encoder or decoder, or may be stored in another computing device.

Figure 4:
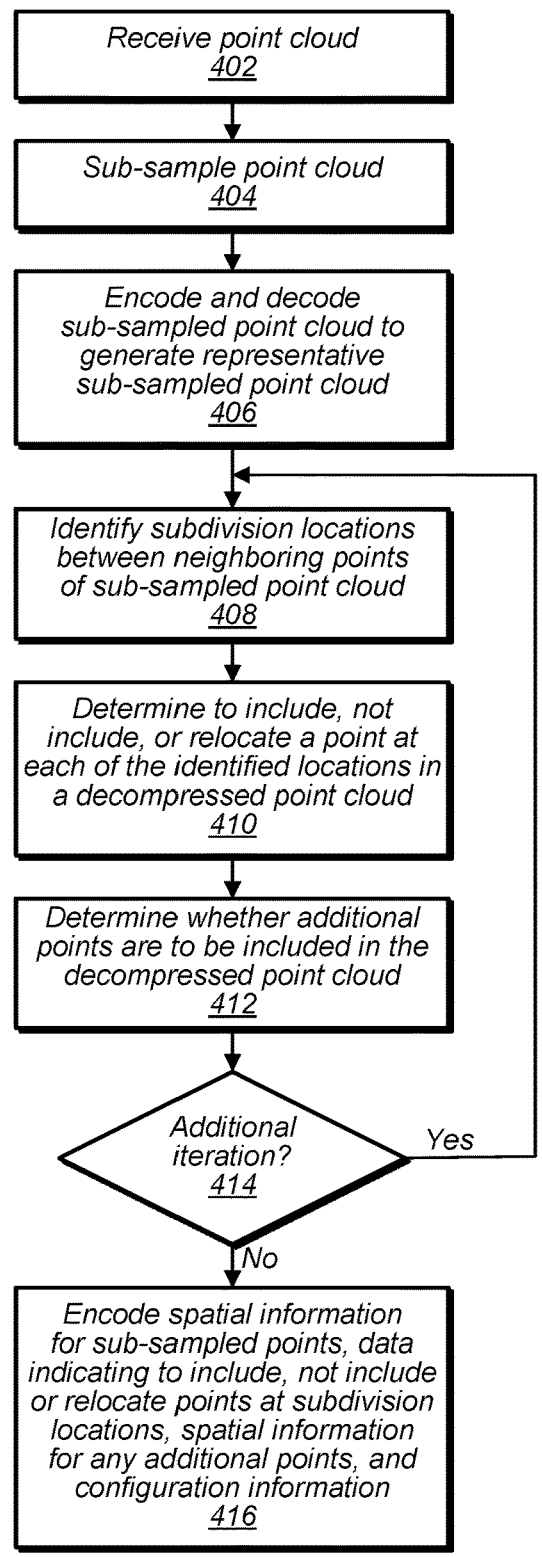
FIG. 4 illustrates a process for encoding a compressed point cloud, according to some embodiments.

FIG. 4 illustrates a process for encoding a compressed point cloud, according to some embodiments.

At 402, an encoder receives a point cloud. The point cloud may be a captured point cloud from one or more sensors or may be a generated point cloud, such as a point cloud generated by a graphics application.

At 404, the encoder sub-samples the received point cloud to generate a sub-sampled point cloud. The sub-sampled point cloud may include fewer points than the received point cloud. For example, the received point cloud may include hundreds of thousands of points or millions of points and the sub-sampled point cloud may include hundreds of points or thousands of points.

At 406 the encoder encodes and decodes the sub-sampled point cloud to generate a representative sub-sampled point cloud the decoder will generate when decoding the compressed point cloud. In some embodiments, the encoder and decoder may execute a lossy compression/decompression algorithm to generate the representative sub-sampled point cloud. In some embodiments, spatial information for points of a sub-sampled point cloud may be quantized as part of generating a representative sub-sampled point cloud. In some embodiments, an encoder may utilize lossless compression techniques and 406 may be omitted. For example, when using lossless compression techniques the original sub-sampled point cloud may be representative of a sub-sampled point cloud the decoder will generate because in lossless compression data may not be lost during compression and decompression.

Figure 5:
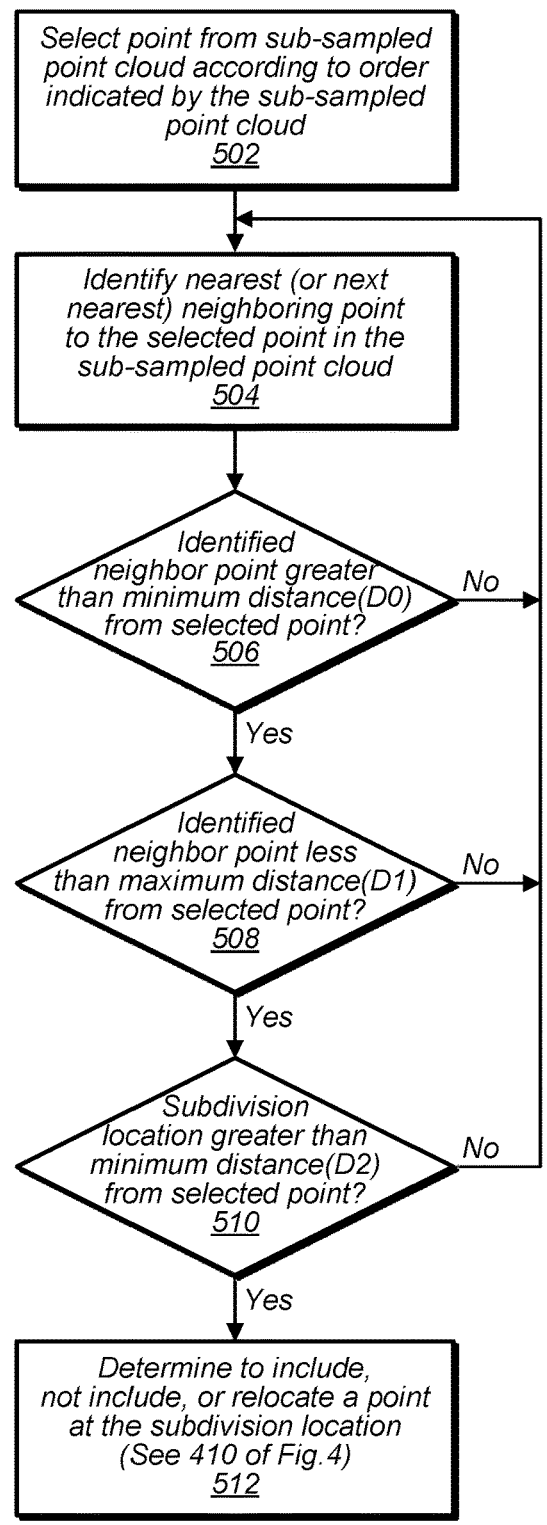
FIG. 5 illustrates a process for determining subdivision locations for a sub-sampled point cloud when encoding a compressed point cloud, according to some embodiments.

At 408, the encoder identifies subdivision locations between points of the sub-sampled point cloud according to configuration parameters selected for compression of the point cloud or according to fixed configuration parameters. The configuration parameters used by the encoder that are not fixed configuration parameters are communicated to a decoder by including values for the configuration parameters in a compressed point cloud. Thus, a decoder may determine the same subdivision locations as the encoder evaluated based on subdivision configuration parameters included in the compressed point cloud. FIG. 5 discusses how an encoder identifies subdivision locations according to configuration parameters in more detail.

At 410, the encoder determines for respective ones of the subdivision locations whether a point is to be included or not included at the subdivision location in a decompressed point cloud. Data indicating this determination is encoded in the compressed point cloud. In some embodiments, the data indicating this determination may be a single bit that if "true" means a point is to be included and if "false" means a point is not to be included. Additionally, an encoder may determine that a point that is to be included in a decompressed point cloud is to be relocated relative to the subdivision location in the decompressed point cloud. For such points, the encoder may further encode data indicating how to relocate the point relative to the subdivision location. In some embodiments, location correction information may be quantized and entropy encoded. In some embodiments, the location correction information may comprise delta X, delta Y, and/or delta Z values indicating how the point is to be relocated relative to the subdivision location. In other embodiments, the location correction information may comprise a single scalar value which corresponds to the normal component of the location correction information computed as follows:

$$\Delta N = ([X_A, Y_A, Z_A] - [X, Y, Z]) \cdot [\text{Normal Vector}]$$

In the above equation, delta N is a scalar value indicating location correction information that is the difference between the relocated or adjusted point location relative to the subdivision location (e.g. $[X_A, Y_A, Z_A]$) and the original subdivision location (e.g. $[X, Y, Z]$). The cross product of this vector difference and the normal vector at the subdivision location results in the scalar value delta N. Because a decoder can determine, the normal vector at the subdivision location, and can determine the coordinates of the subdivision location, e.g. $[X, Y, Z]$, the decoder can also determine the coordinates of the adjusted location, e.g. $[X_A, Y_A, Z_A]$, by solving the above equation for the adjusted location, which represents a relocated location for a point relative to the subdivision location. In some embodiments, the location correction information may be further decomposed into a normal component and one or more additional tangential components. In such an embodiment, the normal component, e.g. delta N, and the tangential component(s) may be quantized and encoded for inclusion in a compressed point cloud.

At 412, the encoder determines whether one or more additional points (in addition the sub-sampled points and in addition to points included at subdivision locations or points included at locations relocated relative to subdivision locations) are to be included in a decompressed point cloud. For example, if the original point cloud has an irregular surface or shape such that subdivision locations between points in the sub-sampled point cloud do not adequately represent the irregular surface or shape, the encoder may determine to include one or more additional points in addition to points determined to be included at subdivision locations or relocated relative to subdivision locations in the decompressed point cloud. Additionally, an encoder may determine whether one or more additional points are to be included in a decompressed point cloud based on system constraints, such as a target bitrate, a target compression ratio, a quality target metric, etc. In some embodiments, a bit budget may change due to changing conditions such as network conditions, processor load, etc. In such embodiments, an encoder may adjust a quantity of additional points that are to be included in a decompressed point cloud based on a changing bit budget. In some embodiments, an encoder may include additional points such that a bit budget is consumed without being exceeded. For example, when a bit budget is higher, an encoder may include more additional points to consume the bit budget (and enhance quality) and when the bit budget is less, the encoder may include fewer additional points such that the bit budget is consumed but not exceeded.

At 414, the encoder determines whether additional subdivision iterations are to be performed. If so, the points determined to be included, relocated, or additionally included in a decompressed point cloud are taken into account and the process reverts to 408 to identify new subdivision locations of an updated sub-sampled point cloud that includes the points determined to be included, relocated, or additionally included in a decompressed point cloud. In some embodiments, a number of subdivision iterations to be performed (N) may be a fixed or configurable parameter of an encoder/decoder. In some embodiments, different subdivision iteration values may be assigned to different portions of a point cloud. For example, an encoder may take into account a point of view from which the point cloud is being viewed and may perform more subdivision iterations on points of the point cloud in the foreground of the point cloud as viewed from the point of view and fewer subdivision iterations on points in a background of the point cloud as viewed from the point of view.

At 416, the spatial information for the sub-sampled points of the point cloud are encoded and included in the compressed point cloud. Additionally, subdivision location inclusion and relocation data is encoded and included in the compressed point cloud along with spatial information for any additional points that are to be included in a decompressed point cloud. Additionally, any configurable parameters selected by the encoder or provided to the encoder from a user are encoded to be included with the compressed point cloud. The compressed point cloud may then be sent to a receiving entity as a compressed point cloud file, multiple compressed point cloud files, or may be packetized and communicated via multiple packets to a receiving entity, such as a decoder or a storage device.

FIG. 5 illustrates a process for sub-dividing a sub-sampled point cloud, according to some embodiments. Steps 502-512 illustrated in FIG. 5 may be performed as part of identifying subdivision locations, such as in 408 in FIG. 4.

At 502, a subdivision location evaluator, such as subdivision location evaluator 206 of encoder 202 illustrated in FIG. 2A, selects a selected point from a sub-sampled point cloud, such as a sub-sampled point cloud resulting from subsampling at 404 in FIG. 4 or a representative sub-sampled point cloud, such as resulting from 406 in FIG. 4. In some embodiments, points of a sub-sampled point cloud may be ordered, and the subdivision location evaluator may select the first (or next) point in the order. The sub-sampled points may be communicated to the decoder in the same order, such that the decoder selects points to be evaluated from the sub-sampled point cloud or the representative sub-sampled point cloud in the same order as they were selected for evaluation by the encoder.

At 504, the subdivision location evaluator identifies the nearest neighboring point to the selected point (or in subsequent iterations, the next nearest neighboring point). At 506, the subdivision location evaluator determines if the identified nearest or next nearest neighboring point is at least a minimum distance (D0) from the selected point being evaluated. In some embodiments, D0 may be a configurable parameter that the encoder communicates to a decoder in a compressed point cloud. If the nearest or next nearest neighboring point is closer to the selected point being evaluated than the minimum distance D0, the neighboring point is not further evaluated for a subdivision location, and the process reverts to 504, wherein a next nearest neighboring point is selected.

If the identified neighboring point being evaluated at 506 is farther away from the selected point than the minimum distance, it is determined at 508 whether the identified neighboring point being evaluated is closer to the selected point being evaluated than a maximum distance (D1). D1 also may be a configurable parameter that the encoder communicates to a decoder in a compressed point cloud. If the identified neighboring point being evaluated is farther away from the selected point being evaluated than the maximum distance (D1), the identified neighboring point being evaluated may not be further evaluated for a subdivision location and the process may revert to 504 wherein another neighboring point is selected, or if no neighboring points are within D0 and D1, the process may complete and revert to 410 of FIG. 4 (e.g. 512 of FIG. 5).

At 510, a subdivision location, between the selected point being evaluated and the identified neighboring point being evaluated, is evaluated to determine if the subdivision location is at least at a minimum distance away from the selected point being evaluated (D2). In some embodiments the subdivision location may be at a midpoint between the selected point being evaluated and the identified neighboring point being evaluated. In some embodiments, the subdivision location may be at a location other than a midpoint between the selected point being evaluated and the identified neighboring point being evaluated. For example, in some embodiments, an encoder may select a configuration parameter for determining a subdivision location between a selected point being evaluated and an identified neighboring point being evaluated. This parameter (M) may be communicated to a decoder in a compressed point cloud.

If the subdivision location is greater than the minimum distance D2 from the selected point being evaluated, the subdivision may be a valid subdivision location and the encoder may determine if a point is to be included at the subdivision location, not included at the subdivision location, or relocated relative to the subdivision location at 512. Note that 512 may be the same as 410 in FIG. 4, and the encoder may continue with steps 412-416 shown in FIG. 4.

Figure 6A:
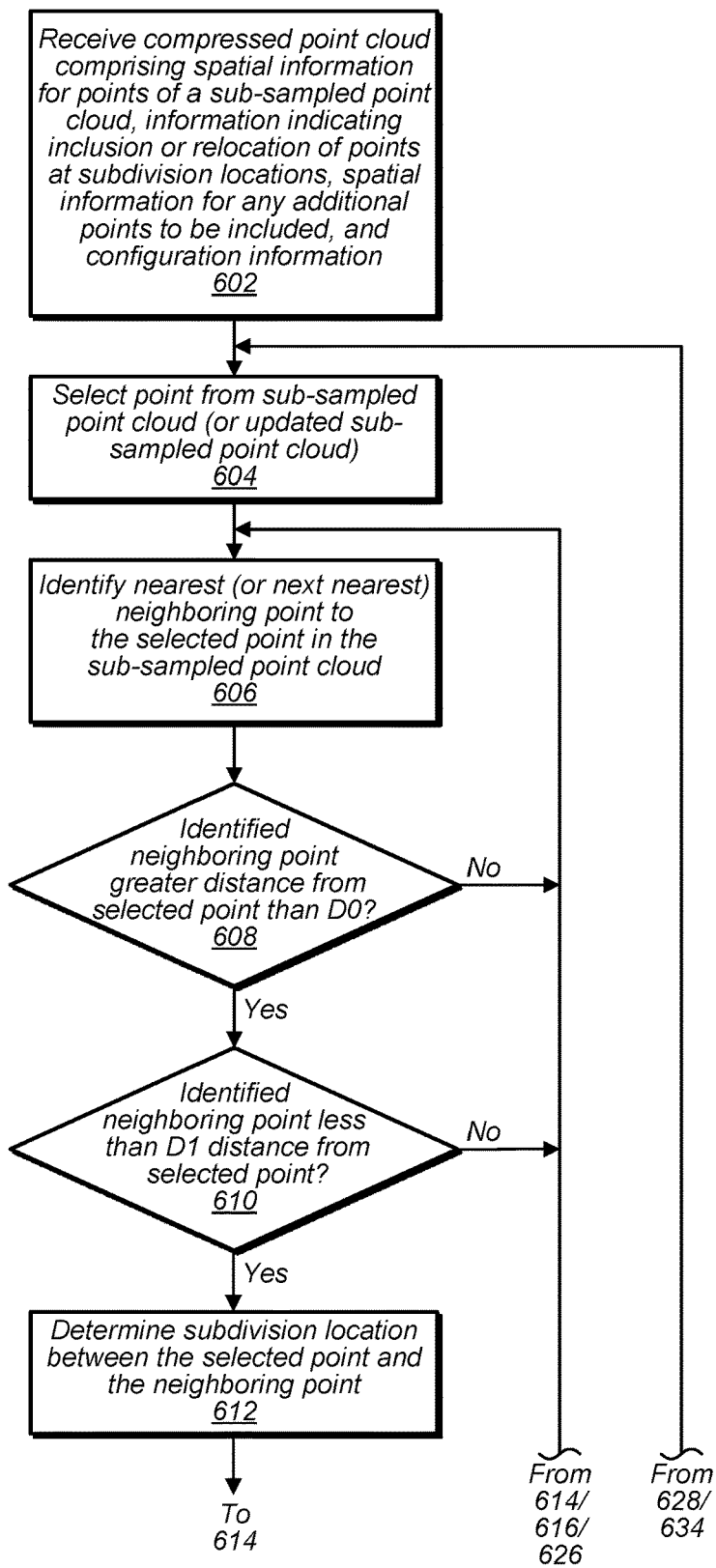
FIGS. 6A-C illustrate a process for decoding a compressed point cloud, according to some embodiments.
Figure 6B:
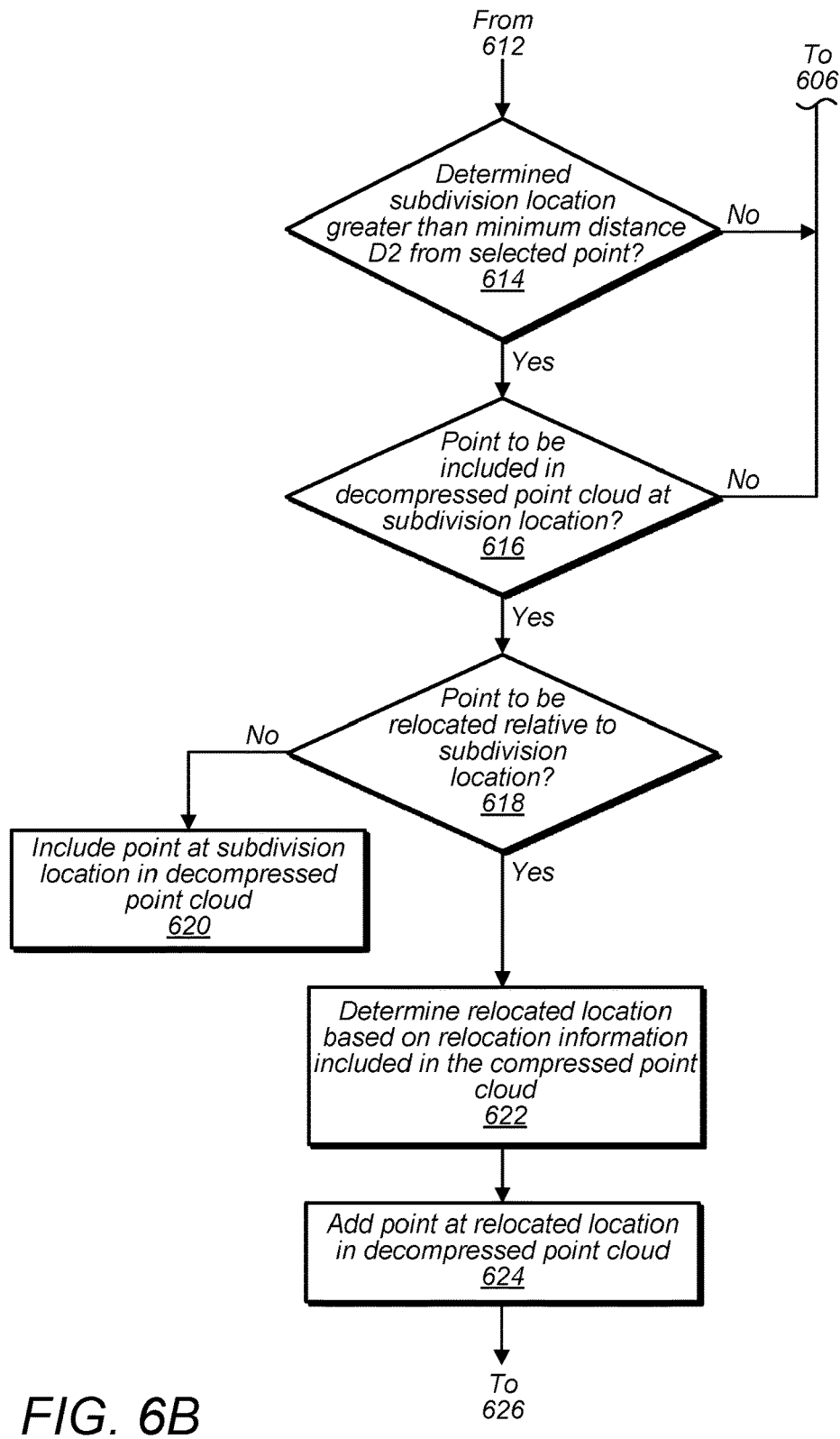
Figure 6C:
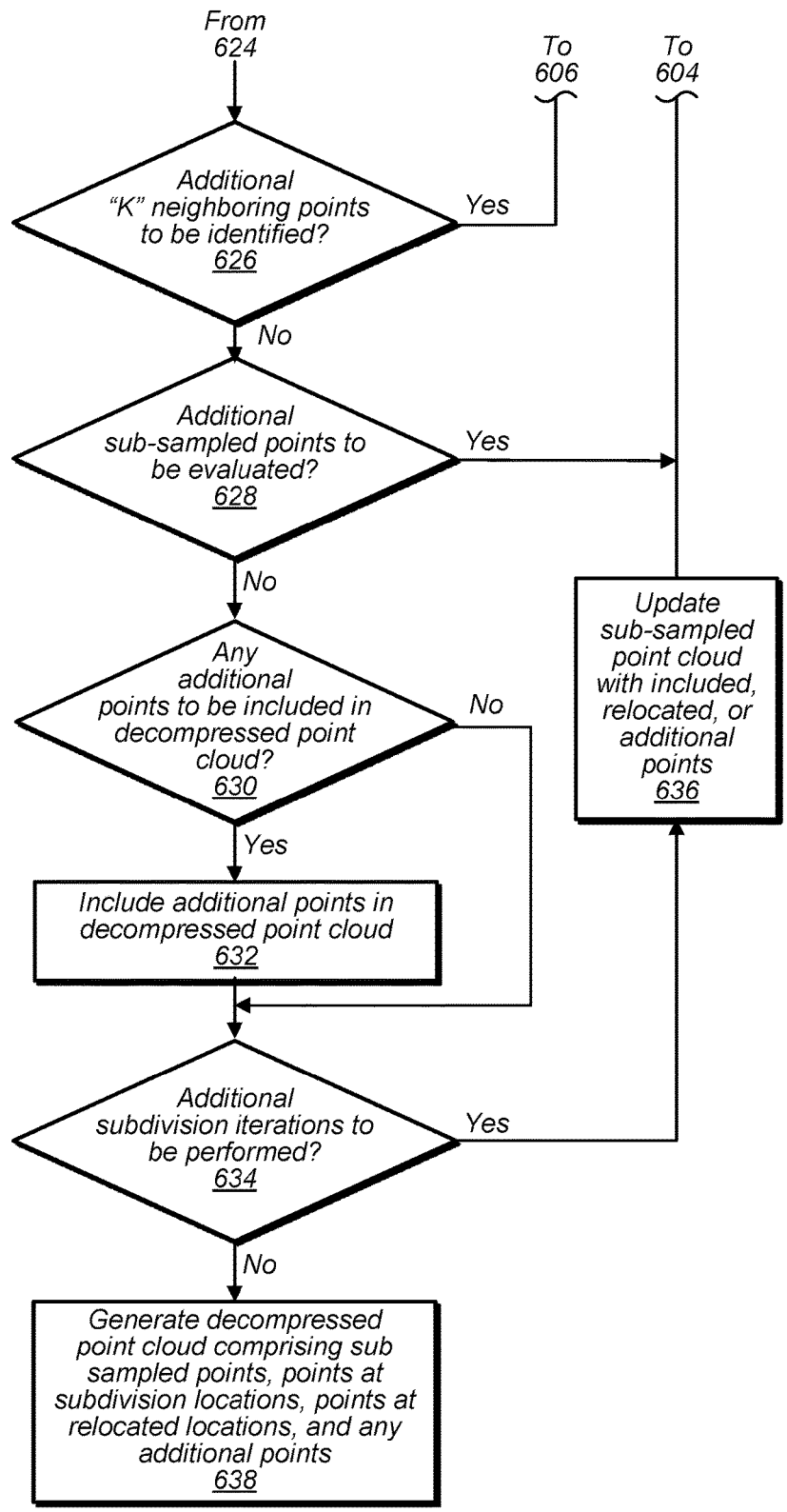

FIG. 6 illustrates a process for decoding a compressed point cloud, according to some embodiments. A decoder may perform similar steps as described for an encoder in FIGS. 4 and 5 to generate a decompressed point cloud based on information included in a compressed point cloud received from an encoder following a similar process as outlined in FIGS. 4 and 5.

At 602, the decoder receives a compressed point cloud. The compressed point cloud may include spatial information for points of a sub-sampled point cloud, information indicating inclusion or relocation of points at subdivision locations, spatial information for any additional points to be included in a decompressed point cloud, and configuration information. In some embodiments, the sub-sampled point cloud may be communicated to the decoder in an encoded format. For example the spatial information for the points of the sub-sampled point cloud may have been encoded using an arithmetic encoding technique or a Golomb encoding technique at an encoder. In such embodiments, the decoder may decode the encoded spatial information for the points of the sub-sampled point cloud, such that the spatial information for the points of the sub-sampled point cloud can be used to determine additional points to be included in a decompressed point cloud generated from the compressed point cloud.

At 604, a subdivision point evaluator of a decoder, such as subdivision point evaluator 226 of decoder 220 illustrated in FIG. 2B, selects a point from the sub-sampled point cloud communicated in the compressed point cloud to evaluate for subdivision locations. In subsequent iterations, the selected point may be a point of an updated sub-sampled point cloud that includes points determined to be included in a decompressed point cloud in a previous iteration of determining subdivision locations. In some embodiments, the points of the sub-sampled point cloud may be ordered such that the subdivision point evaluator of the decoder selects points of the sub-sampled point cloud to be evaluated in a same order as which the points were evaluated at an encoder.

At 606, the subdivision point evaluator of the decoder identifies a nearest (or next nearest) neighboring point to the selected point of the sub-sampled point cloud being evaluated. At 608, the subdivision point evaluator of the decoder determines if the selected neighboring point is at least at a minimum distance (D0) from the selected point being evaluated. If the neighboring point is not at least at the minimum distance D0 from the selected point being evaluated, the subdivision point evaluator reverts to 606 and selects another neighboring point. If the neighboring point is at a greater distance than the minimum distance D0 from the selected point being evaluated, at 610 the subdivision point evaluator determines if the neighboring points is within a maximum distance D1 from the selected point being evaluated. If the neighboring point is not within the maximum distance D1 from the selected point being evaluated, the subdivision point evaluator reverts to 606 and selects another neighboring point. If there are not any neighboring points within D0 and D1, the subdivision point evaluator reverts to 604 and evaluates another point.

If the neighboring point is within D0 and D1, at 612 the subdivision point evaluator determines a subdivision location between the selected point being evaluated and the current neighboring point being evaluated. In some embodiments, the subdivision location may be a midpoint, or may be at a location other than a midpoint, wherein configuration information included in the compressed point cloud indicates how a subdivision location is to be determined between a point and a neighboring point. At 614, the subdivision point evaluator of the decoder determines if the determined subdivision location is at least a minimum distance D2 from the selected point being evaluated. In some embodiments, the parameters D0, D1, and/or D2 may be communicated in a compressed point cloud or may be fixed parameters that are the same at both the encoder and the decoder. If the determined subdivision location is not at least at the minimum distance D2 from the selected point being evaluated, the subdivision point evaluator of the decoder reverts to 606 and identifies another neighboring point to evaluate.

At 616, once a valid subdivision location is determined, the subdivision point evaluator determines, based on the subdivision location point inclusion/relocation data included in the compressed point cloud, whether a point is to be included at the subdivision location. If a point is not to be included at the subdivision location, the subdivision point evaluator reverts to 606 and identifies another neighboring point to evaluate.

At 618, the subdivision point evaluator determines if the point is to be relocated relative to the subdivision location. If the point is not to be relocated, the subdivision point evaluator causes, at 620, a point to be included at the subdivision location in the decompressed point cloud. If the point is to be relocated, the decoder, at 622, utilizes relocation information included in the compressed point cloud to determine a location relative to the subdivision location where a point is to be included in the decompressed point cloud and causes, at 624, the point to be included in the decompressed point cloud.

At 626, the decoder determines based on configuration information whether there are additional neighboring points that are to be evaluated for the selected point. For example, a configuration parameter "K" included in the compressed point cloud may indicate a number of neighboring points that are to be included in a set of neighboring points to be evaluated for subdivision locations for a given selected point being evaluated. If there are additional neighboring points to be evaluated, the decoder may revert to 606, and the subdivision point evaluator may evaluate another neighboring point that neighbors the selected point being evaluated. If there are not any additional neighboring points to be evaluated for the selected point, the decoder may determine, at 628, if there are additional points of the sub-sampled point cloud that are to be evaluated. If there are additional points of the sub-sampled point cloud to be evaluated, the decoder may revert to 604 and select the next point of the points of the sub-sampled point cloud to evaluate and may perform the same process described above for the next point in the sub-sampled point cloud. In some embodiments, the points of the sub-sampled point cloud may be communicated to the decoder in an order such that the decoder selects the points of the sub-sampled point cloud to be evaluated in a same order in which they were evaluated at the encoder.

If there are not any additional points of the sub-sampled point cloud to be evaluated, the decoder may determine at 630, if there are any additional points that are to be included in the decompressed point cloud for the current subdivision iteration. If there are additional points to be included, they may be included at 632. If not, 632 may be skipped.

At 634, the decoder determines if there are additional subdivision iterations to be performed. For example, the compressed point cloud may include a configuration parameter "N" indicating a number of subdivision iterations that are to be performed when generating a decompressed point cloud from the compressed point cloud. If there is an additional subdivision iteration to be performed, the decoder, at 636, updates the current sub-sampled point cloud with any points determined to be included at a subdivision location or relocated relative to a subdivision location, along with any additional points determined to be included in the decompressed point cloud. Subsequent to updating the current sub-sampled point cloud, the decoder reverts to 604 and repeats the process using the updated sub-sampled point cloud to determine subdivision locations.

If there are not any additional subdivision iterations yet to be performed, the decoder generates the decompressed point cloud at 638. The decompressed point cloud includes the points of the original sub-sampled point cloud included in the compressed point cloud and any points determined to be included or relocated relative to any subdivision locations determined during any of the subdivision iterations, along with any additional points determined to be included in the decompressed point cloud during any of the subdivision iterations.

Figure 7:
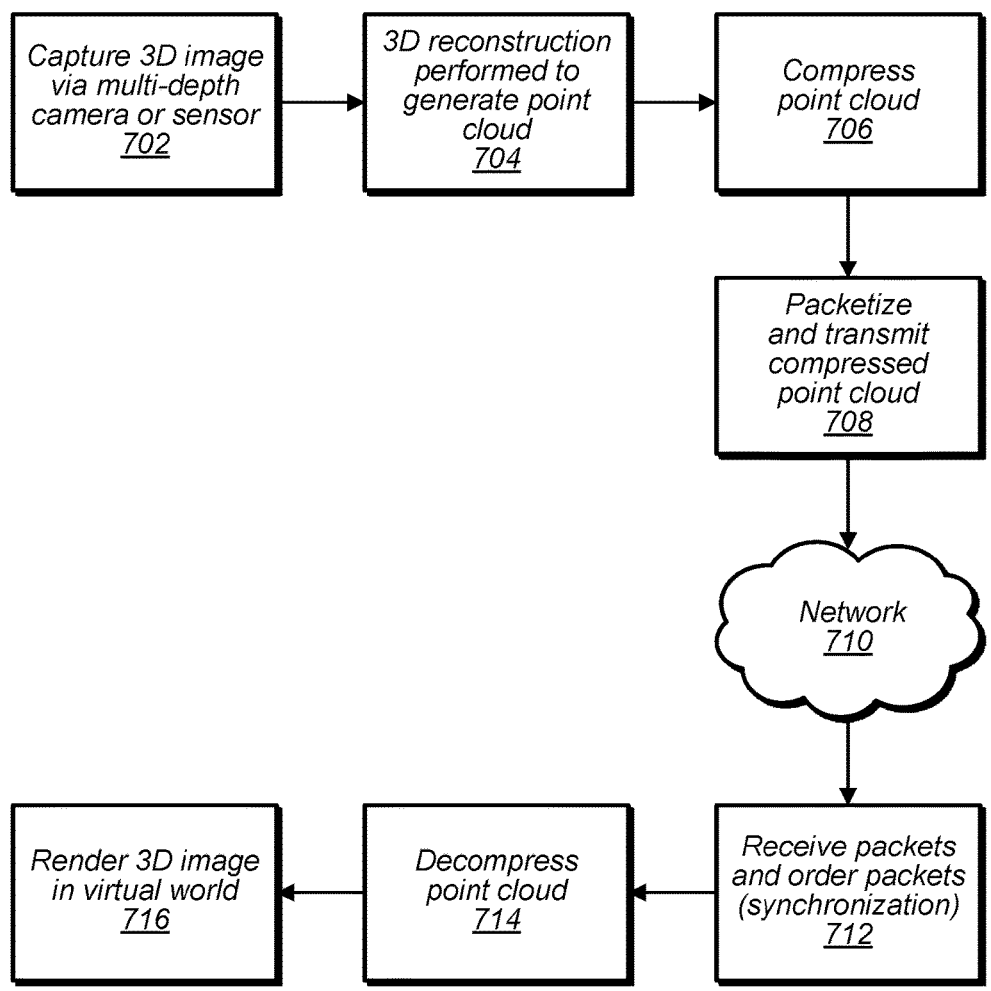
FIG. 7 illustrates a compressed point cloud being used in a 3-D telepresence application, according to some embodiments.

FIG. 7 illustrates compressed point clouds being used in a 3-D telepresence application, according to some embodiments.

In some embodiments, a sensor, such as sensor 102, an encoder, such as encoder 104 or encoder 202, and a decoder, such as decoder 116 or decoder 220, may be used to communicate point clouds in a 3-D telepresence application. For example, a sensor, such as sensor 102, at 702 may capture a 3D image and at 704, the sensor or a processor associated with the sensor may perform a 3D reconstruction based on sensed data to generate a point cloud.

At 706, an encoder such as encoder 104 or 202 may compress the point cloud and at 708 the encoder or a post processor may packetize and transmit the compressed point cloud, via a network 710. At 712, the packets may be received at a destination location that includes a decoder, such as decoder 116 or decoder 220. The decoder may decompress the point cloud at 714 and the decompressed point cloud may be rendered at 716. In some embodiments a 3-D telepresence application may transmit point cloud data in real time such that a display at 716 represents images being observed at 702. For example, a camera in a canyon may allow a remote user to experience walking through a virtual canyon at 716.

Figure 8:
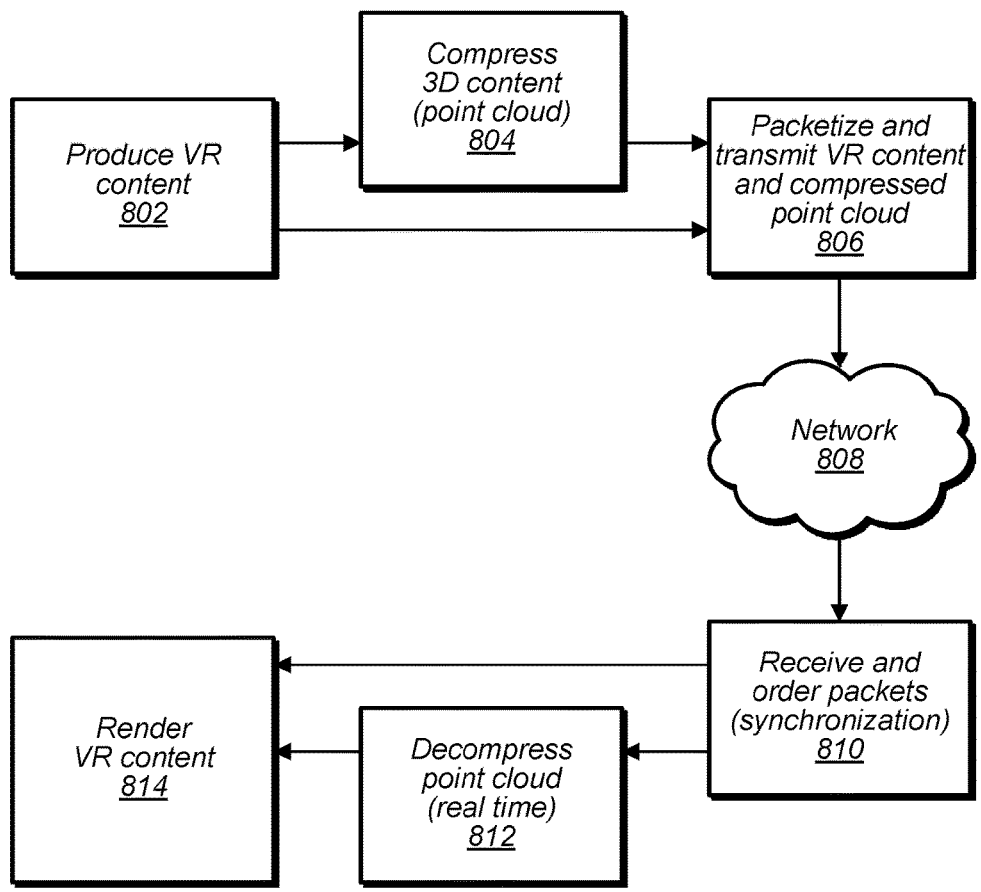
FIG. 8 illustrates a compressed point cloud being used in a virtual reality application, according to some embodiments.

FIG. 8 illustrates compressed point clouds being used in a virtual reality (VR) or augmented reality (AR) application, according to some embodiments.

In some embodiments, point clouds may be generated in software (for example as opposed to being captured by a sensor). For example, at 802 virtual reality or augmented reality content is produced. The virtual reality or augmented reality content may include point cloud data and non-point cloud data. For example, a non-point cloud character may traverse a landscape represented by point clouds, as one example. At 804, the point cloud data may be compressed and at 806 the compressed point cloud data and non-point cloud data may be packetized and transmitted via a network 808. For example, the virtual reality or augmented reality content produced at 802 may be produced at a remote server and communicated to a VR or AR content consumer via network 808. At 810, the packets may be received and synchronized at the VR or AR consumer's device. A decoder operating at the VR or AR consumer's device may decompress the compressed point cloud at 812 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 9:
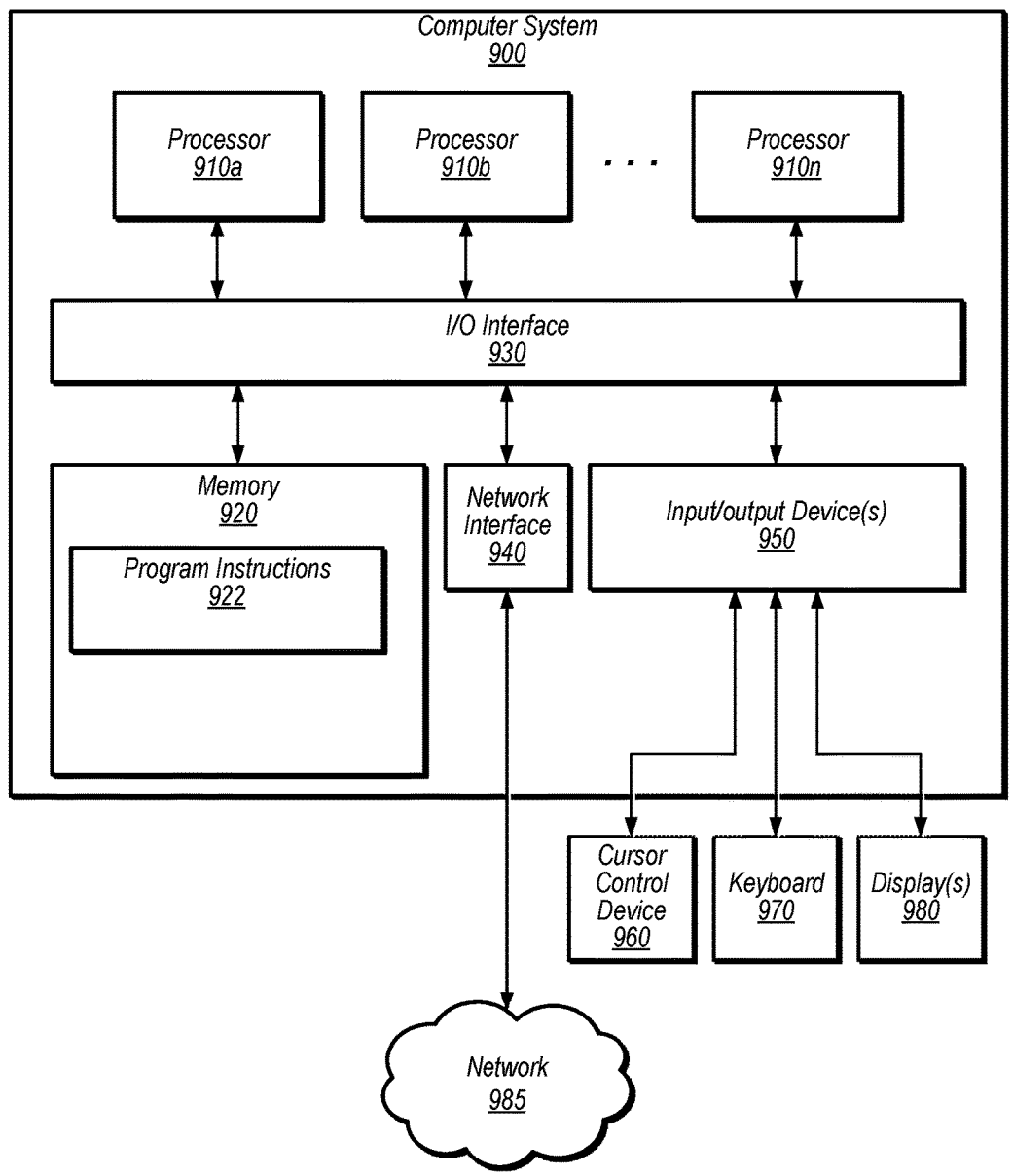
FIG. 9 illustrates an example computer system that may implement an encoder or decoder, according to some embodiments.

FIG. 9 illustrates an example computer system 900 that may implement an encoder or decoder or any other ones of the components described herein, (e.g., any of the components described above with reference to FIGS. 1-8), in accordance with some embodiments. The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 900, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store point cloud compression or point cloud decompression program instructions 922 and/or sensor data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement an image sensor control application incorporating any of the functionality described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system comprising: one or more sensors configured to capture a plurality of points that make up a point cloud, wherein each of the respective points comprises spatial information identifying a spatial location of the respective point; and an encoder configured to generate a compressed point cloud, wherein to generate the compressed point cloud, the encoder is configured to: sub-sample a captured point cloud captured by the one or more sensors, wherein the sub-sampled point cloud comprises fewer points than the captured point cloud; and for respective ones of the points of the sub-sampled point cloud: identify a location between the respective point of the sub-sampled point cloud and a neighboring point in the sub-sampled point cloud; and determine, based on comparing the location to the captured point cloud, whether a point in a decompressed point cloud is to be included at the location, not included at the location, or relocated relative to the location; and encode data for the compressed point cloud comprising: spatial information for the points of the sub-sampled point cloud; and data indicating, for each of the respective locations, whether a respective point is to be included at the location, not included at the location, or relocated relative to the location in the decompressed point cloud.

2. The system of claim 1, wherein for the respective ones of the points of the sub-sampled point cloud the encoder is further configured to; identify a set of neighboring points, wherein said identify a location between the respective point of the sub-sampled point cloud and a neighboring point in the sub-sampled point cloud comprises identifying a location between the respective point and respective ones of the neighboring points of the set of neighboring points, and wherein said determine, based on comparing the location to the captured point cloud, whether a point in a decompressed point cloud is to be included at the location, not included at the location, or relocated relative to the location comprises performing said determining for each of the respective locations between the respective point and the respective ones of the neighboring points of the set of neighboring points.

3. The system of claim 2, wherein a number of nearest neighboring points to be included in the set of neighboring points for the respective point is a configurable parameter configurable by the encoder, wherein the encoder is further configured to encode for the compressed point cloud data indicating the number of nearest neighboring points to be included in the set of neighboring points, wherein a decoder uses the encoded data indicating the number of nearest neighbors to be included in the set of neighboring points when generating the decompressed point cloud.

4. The system of claim 3, wherein to identify the set of neighboring points, the encoder is configured to identify neighboring points that are at a distance from the respective point that is greater than a minimum distance from the respective point and less than a maximum distance from the respective point, wherein the minimum distance and the maximum distance are configurable parameters configurable by the encoder, wherein the encoder is further configured to encode data for the compressed point cloud indicating the minimum distance and the maximum distance, wherein a decoder uses the encoded data indicating the minimum distance and the maximum distance when generating the decompressed point cloud.

5. The system of claim 4, wherein the number of nearest neighboring points, the minimum distance, and the maximum distance are user-configurable parameters.

6. The system of claim 1, wherein the encoder is further configured to: determine whether one or more additional points are to be included in the decompressed point cloud, based on comparing the captured point cloud to the sub-sampled points, the points determined to be included in the decompressed point cloud, and the points determined to be relocated in the decompressed point cloud; and encode data for the compressed point cloud comprising spatial information for the one or more additional points to be included in the decompressed point cloud.

7. The system of claim 1, wherein the encoder is further configured to: subsequent to determining one or more points to be included in the decompressed point cloud or one or more points to be relocated in the decompressed point cloud, add the one or more points or the one or more relocated points to the sub-sampled point cloud as points of an updated sub-sampled point cloud; and for respective ones of the points of the updated sub-sampled point cloud: identify a location between the respective point of the updated sub-sampled point cloud and a neighboring point in the updated sub-sampled point cloud; and determine, based on comparing the location to the captured point cloud, whether a point in a decompressed point cloud is to be included at the location, not included at the location, or relocated relative to the location, wherein to encode data for the compressed point cloud, the encoder is configured to encode data comprising data indicating, for respective locations of each of one or more respective updated sub-sampled point clouds, whether a respective point is to be included at the respective location, not included at the respective location, or relocated relative to the respective location in the decompressed point cloud.

8. A method of generating a compressed point cloud comprising: sub-sampling a point cloud, wherein the sub-sampled point cloud comprises fewer points than the point cloud; and for respective ones of the points of the sub-sampled point cloud: comparing a location between the respective point of the sub-sampled point cloud and a neighboring point in the sub-sampled point cloud to the point cloud prior to the sub-sampling; and determining, based on the comparison, whether: a point is to be included at the location, not included at the location, or relocated relative to the location in a decompressed point cloud; and encoding data comprising spatial information for the points of the sub-sampled point cloud and data indicating, for each of the respective locations, whether a respective point is to be included at the location, not included at the location, or relocated relative to the location in a decompressed point cloud.

9. The method of claim 8, further comprising: identifying, for the respective ones of the points of the sub-sampled point cloud, a set of neighboring points; wherein said identifying a location between the respective point of the sub-sampled point cloud and a neighboring point in the sub-sampled point cloud comprises identifying a location between the respective point and each of the neighboring points of the set of neighboring points.

10. The method of claim 9, wherein said identifying, for each of the respective ones of the points of the sub-sampled point cloud, a set of neighboring points comprises: identifying one or more neighboring points that are at a distance from the respective point that is greater than a minimum distance from the respective point and less than a maximum distance from the respective point, wherein the minimum distance and the maximum distance are configurable parameters configurable by an encoder.

11. The method of claim 8, further comprising: determining, based on the sub-sampled point cloud and the points determined to be included in the decompressed point cloud or relocated in the decompressed point cloud, whether one or more additional points are to be included in the decompressed point cloud; and encoding data for the compressed point cloud comprising spatial information for the additional points to be included in the decompressed point cloud.

12. The method of claim 8, further comprising: encoding, at an encoder, the sub-sampled point cloud according to a lossy compression algorithm; and decoding, at the encoder, the sub-sampled point cloud encoded according to the lossy compression algorithm to result in a representative decoded sub-sampled point cloud at the encoder, wherein said comparing a location between the respective point of the sub-sampled point cloud and a neighboring point in the subsampled point cloud to the point cloud prior to sub-sampling, is performed using a respective point and a neighboring point of the representative decoded sub-sampled point cloud at the encoder.

13. The method of claim 8, wherein said encoding data indicating whether a point is to be relocated relative to a respective location in a decompressed point cloud comprises: encoding data indicating a movement in an X, Y, or Z direction for the respective point relative to the location.

14. The method of claim 8, wherein said encoding data indicating whether a point is to be relocated to a respective location in a decompressed point cloud comprises: encoding a scalar value indicating a difference between a normal vector normal to a surface of the sub-sampled point cloud at the respective location and a normal vector normal to the surface of the sub-sampled point cloud when the point is relocated, wherein a decoder determines the location of the relocated midpoint based on the scalar value and the normal vector to the surface of the sub-sampled point cloud at the respective location.

15. A non-transitory computer-readable medium storing program instructions that, when executed by one or more processors, cause the one or more processors to implement a decoder configured to: receive a compressed point cloud, wherein the compressed point cloud comprises spatial information for points of a sub-sampled point cloud and data indicating, for each of a plurality of respective locations between respective points of the sub-sampled point cloud and respective neighboring points in the sub-sampled point cloud, whether a point is to be included at the respective location, not included at the respective location, or relocated relative to the respective location in a decompressed point cloud; for respective ones of the points of the sub-sampled point cloud: identify a respective location between the respective point and a neighboring point in the sub-sampled point cloud; and determine, based on the data included in the received compressed point cloud, whether to include, not include, or relocate a point at the respective location; and generate the decompressed point cloud, wherein the decompressed point cloud comprises the points of the sub-sampled point cloud and the respective points determined to be included at the respective locations or relocated relative to the respective locations.

16. The non-transitory computer-readable medium of claim 15, wherein the compressed point cloud further comprises data indicating a number of nearest neighbors that are to be included in a set of nearest neighbors for respective ones of the points of the sub-sampled point cloud, wherein the decoder is further configured to: for the respective ones of the points of the sub-sampled point cloud: identify a set of neighboring points, wherein the set comprises the indicated number of nearest neighbors; identify a location between the respective point and each of the neighboring points of the set of neighboring points; and determine, based on the data included in the received compressed point cloud, whether to include, not include, or relocate a point at each of the locations between the respective point and each of the neighboring points of the set of neighboring points.

17. The non-transitory computer-readable medium of claim 16, wherein the compressed point cloud further comprises data indicating a minimum distance from the respective point and a maximum distance from the respective point for nearest neighbors that are to be included in the set of nearest neighbors for the respective ones of the points of the sub-sampled point cloud, wherein the neighboring points identified to be included in the set of neighboring points are located a distance from the respective point that is greater than the minimum distance and less than the maximum distance.

18. The non-transitory computer-readable medium of claim 15, wherein the compressed point cloud further comprises data indicating a minimum distance from a respective point for a location between the respective point and a neighboring point to be considered, wherein locations less than the minimum distance from a respective point are not further evaluated for inclusion of a point at the location in the decompressed point cloud.

19. The non-transitory computer-readable medium of claim 15, wherein the compressed point cloud further comprises data indicating for a particular location between a respective point and a neighboring point a scalar location correction value, wherein the encoder is configured to: determine a normal vector to the surface of the sub-sampled point cloud; and determine a location for the point relocated relative to the particular location based on a dot product of the scalar value and the determined normal vector.

20. The non-transitory computer-readable medium of claim 15, wherein the decoder is further configured to: add the points determined to be included in the decompressed point cloud to the sub-sampled point cloud to generate an updated sub-sampled point cloud; and for respective ones of the points of the updated sub-sampled point cloud: determine a location between the respective point and a neighboring point in the updated sub-sampled point cloud; and determine, based on the data included in the received compressed point cloud, whether to include, not include, or relocate a point at the location in the decompressed point cloud; wherein the compressed point cloud comprises data indicating a number of iterations of updating a sub-sampled point cloud that are to be performed when generating the decompressed point cloud.

* * * * *